(12) United States Patent
Lusted et al.

(10) Patent No.: US 9,258,082 B2
(45) Date of Patent: *Feb. 9, 2016

(54) NETWORK SYSTEM CONFIGURED FOR RESOLVING FORWARD ERROR CORRECTION DURING A DATA MODE

(71) Applicant: Intel Corporation, Santa Clara, CA (US)

(72) Inventors: Kent C. Lusted, Aloha, OR (US); Ilango S. Ganga, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/882,605

(22) PCT Filed: Mar. 13, 2013

(86) PCT No.: PCT/US2013/030820
§ 371 (c)(1),
(2) Date: Apr. 30, 2013

(87) PCT Pub. No.: WO2014/011224
PCT Pub. Date: Jan. 16, 2014

(65) Prior Publication Data
US 2014/0258813 A1   Sep. 11, 2014

Related U.S. Application Data

(60) Provisional application No. 61/670,099, filed on Jul. 10, 2012.

(51) Int. Cl.
*H03M 13/00* (2006.01)
*H04L 1/00* (2006.01)
*H04L 29/06* (2006.01)

(52) U.S. Cl.
CPC ............ *H04L 1/004* (2013.01); *H04L 69/24* (2013.01); *H04L 2001/0092* (2013.01)

(58) Field of Classification Search
None
See application file for complete search history.

(56) References Cited

U.S. PATENT DOCUMENTS

2010/0229071 A1 * 9/2010 Ganga et al. .................. 714/776
2010/0262844 A1 * 10/2010 Diab et al. .................... 713/300

(Continued)

FOREIGN PATENT DOCUMENTS

JP    2003258937 A    9/2003
JP    2005086642 A    3/2005

(Continued)

OTHER PUBLICATIONS

PCT Application from related matter PCT/US2012/036844, filed May 7, 2012.

(Continued)

*Primary Examiner* — Daniel McMahon
(74) *Attorney, Agent, or Firm* — Grossman, Tucker, Perreault & Pfleger, PLLC

(57) ABSTRACT

Apparatus, systems, and methods for resolving a forward error correction (FEC) protocol include requesting, by a network node element during an auto-negotiation period between the node element and a link partner, to resolve at least one FEC mode during a data mode period, wherein auto-negotiation period occurs before the data mode period. At least one channel quality parameter of at least one channel of a communication link between the network node element and the link partner are determined by the network node element during the data mode period. The network node determines, during the data mode period, whether to enable or disable at least one FEC mode for use by the network node element based on, at least in part, the at least one channel quality parameter.

33 Claims, 9 Drawing Sheets

(56) References Cited

U.S. PATENT DOCUMENTS

| | | | |
|---|---|---|---|
| 2010/0293441 A1* | 11/2010 | Booth | 714/776 |
| 2011/0138250 A1* | 6/2011 | Ganga et al. | 714/758 |
| 2011/0191656 A1 | 8/2011 | Bliss et al. | |
| 2011/0191657 A1* | 8/2011 | Bliss et al. | 714/784 |
| 2014/0223265 A1* | 8/2014 | Lusted et al. | 714/776 |

FOREIGN PATENT DOCUMENTS

| | | | |
|---|---|---|---|
| JP | 2007036712 A | | 2/2007 |
| TW | I282673 B | | 11/2007 |

OTHER PUBLICATIONS

International Search Report and Written Opinion received for Patent Application No. PCT/US2013/030820, mailed on May 23, 2013, 9 pages.

International Preliminary Report on Patentability and Written Opinion Received for PCT Patent Application No. PCT/US2013/030820, mailed on Jan. 22, 2015, 8 pages.

International Preliminary Report on Patentability / with Written Opinion received for PCT Application No. PCT/US2012/36844 mailed on Nov. 20, 2014, 7 pages.

International Search Report and Written Opinion received for PCT Patent Application No. PCT/US2012/036844 , mailed on Feb. 2013, 15 pages.

Marris, "Title Baseline Proposal for 802.3bj Auto-Negotiation", Citation 100 Gb/s Backplane and Copper Cable Task Force Newport Beach Interim Meeting, Jan. 2012.

Mike Dudek Qlogic, "Use of FEC in PAM2 Backplane and Copper", Mar. 2012, 6 pages. web page available at: http://www.ieee802.org/3/bj/public/mar12/dudek_02a_0312.pdf.

"A Few notes on FEC", 100 Gb/s Backplane and Copper Cable Task Force, Waikoloa Plenary Meeting Mar. 2012.

Office Action received for Korean Patent Application No. 2014-7017832, mailed Jun. 1, 2015, 5 pages of English translation and 6 pages Korean Office Action.

Office Action received for Japanese Patent Application No. 2014-552406, mailed Jul. 14, 2015, 2 pages of English translation and 1 page of Japanese Office Action.

Office Action received for Taiwan Patent Application No. 102124391, mailed Aug. 20, 2015, 5 pages of English translation and 5 pages Korean Office Action.

\* cited by examiner

| Cell(s) | Name | Description |
|---|---|---|
| 15:14 | Reserved | Transmitted as 0, ignored on reception. |
| 13 | Preset | 1 = Preset coefficients<br>0 = Normal operation |
| 12 | Initialize | 1 = Initialize coefficients<br>0 = Normal operation |
| 11:6 | Reserved | Transmitted as 0, ignored on reception. |
| 5:4 | Coefficient (+1) update | 5  4<br>1  1 = reserved<br>0  1 = increment<br>1  0 = decrement<br>0  0 = hold |
| 3:2 | Coefficient (0) update | 3  2<br>1  1 = reserved<br>0  1 = increment<br>1  0 = decrement<br>0  0 = hold |
| 1:0 | Coefficient (−1) update | 1  0<br>1  1 = reserved<br>0  1 = increment<br>1  0 = decrement<br>0  0 = hold |

FIG. 1D

| Cell(s) | Name | Description |
|---|---|---|
| 15 | Receiver ready | 1 = The local receiver has determined that training is complete and is prepared to receive data.<br>0 = The local receiver is requesting that training continue. |
| 14:6 | Reserved | Transmitted as 0, ignored on reception. |
| 5:4 | Coefficient (+1) status | 5 4<br>1 1 = maximum<br>1 0 = minimum<br>0 1 = updated<br>0 0 = not_updated |
| 3:2 | Coefficient (0) status | 3 2<br>1 1 = maximum<br>1 0 = minimum<br>0 1 = updated<br>0 0 = not_updated |
| 1:0 | Coefficient (−1) status | 1 0<br>1 1 = maximum<br>1 0 = minimum<br>0 1 = updated<br>0 0 = not_updated |

Leave bits 7:6 reserved, define bits 9:8 as FEC_Type as follows:
00b = no FEC
01b = FEC level 1
10b = FEC level 2
11b = reserved

FIG. 1E

NETWORK SYSTEM CONFIGURED FOR RESOLVING FORWARD ERROR CORRECTION DURING A DATA MODE

This application is a U.S. national stage completion of International Application No. PCT/US2013/030820 filed Mar. 13, 2013, and claims the benefit of U.S. provisional application Ser. No. 61/670,099, filed Jul. 10, 2012, both of which are incorporated by reference in their entirety.

FIELD

The present disclosure relates to a network system configured for resolving forward error correction, and, more particularly, a network system configured for resolving forward error correction enablement during a data mode.

BACKGROUND

Some conventional Ethernet network systems support optional Forward Error Correction (FEC) protocols as an additional measure of packet integrity, which may be useful on channels having marginal quality. FEC protocols are processor intensive, and enabling FEC protocols typically degrades system performance, latency and increase the overall power demand of a network node. In the conventional Ethernet approach, FEC protocols are enabled during an auto-negotiation period between link partners. However, the auto-negotiation period is typically agnostic to the actual quality of the channels between link partners. Instead, the conventional network system measures channel quality during a link training sequence, which is performed after the auto-negotiation period and before the data mode period. Once enabled, the conventional network system does not provide for dynamic adjustment to an FEC state. Thus, while channel quality parameters may change during data mode operations, the conventional network system is not capable of dynamically enabling/disabling FEC protocols during a data mode, and thus, the conventional Ethernet network system may unnecessarily degrade system performance and latency and increase the overall power demand of the network segment and/or degrade packet integrity.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 1D depicts an example of a coefficient update field 162' according to one embodiment of the present disclosure;

FIG. 1E depicts an example of a status report field 164' according to one embodiment of the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure relates to network systems (and methods) configured to enable and/or disable at least one FEC protocol during a data mode period (also referred to herein as a "link up state"). During the auto-negotiation period, the respective FEC capabilities of a node element and a link partner are identified, and the node element requests to resolve identified FEC capabilities during the link up state. During the data mode period, at least one channel quality parameter of at least one channel of a communication link between the network controller and the link partner is determined. Based on the channel quality determined during the data mode, at least one FEC mode may be enabled or disabled. A plurality of FEC modes may be enabled or disabled during the data mode period. For communication links with multiple channels, the link quality may be determined on a channel-by-channel basis, and each node element may asynchronously enable different FEC capabilities, based on individual channel quality measurements.

Figure 1:
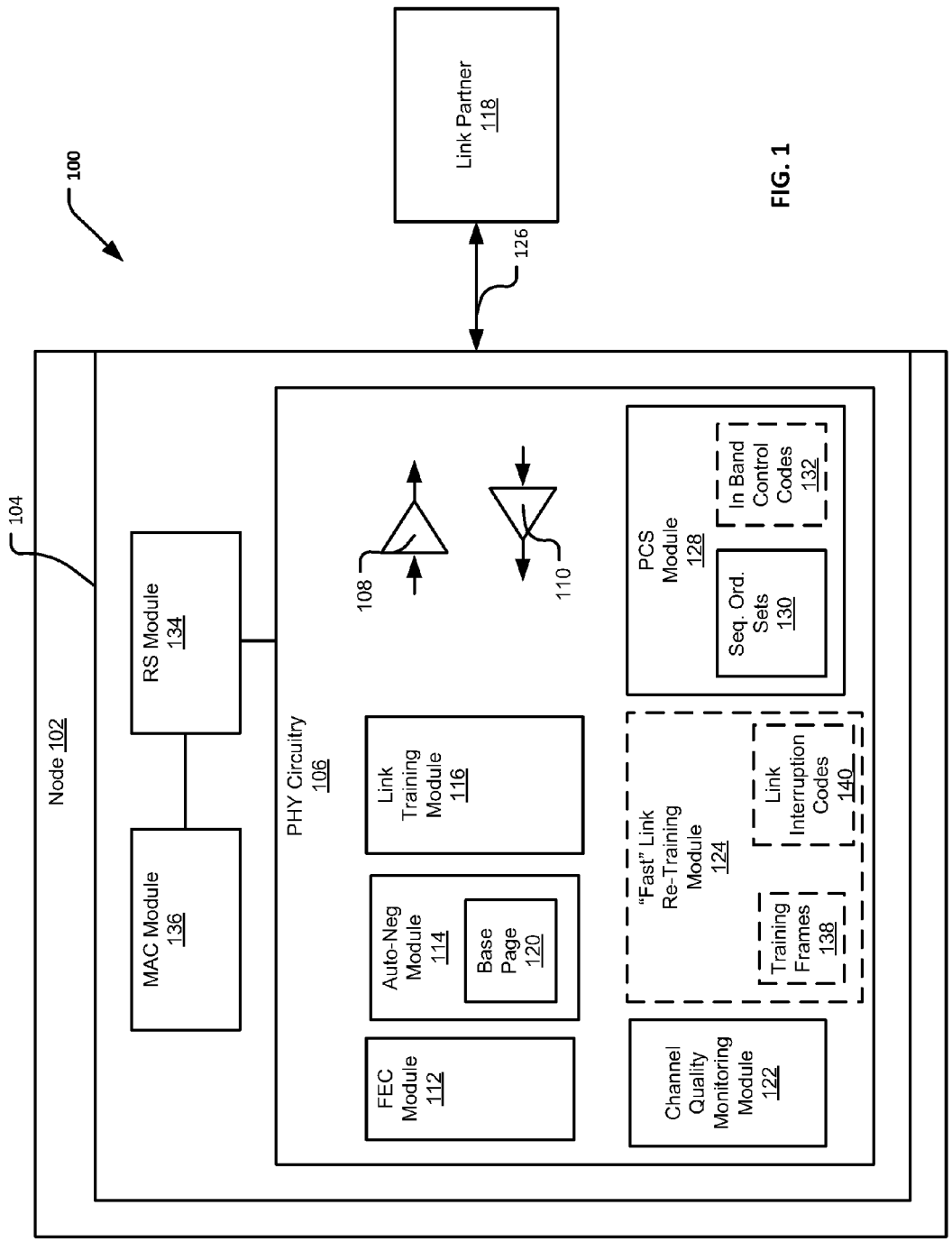
FIG. 1 illustrates a network system consistent with various embodiments of the present disclosure.

FIG. 1 illustrates a network system 100 consistent with various embodiments of the present disclosure. Network system 100 generally includes at least one network node element 102 and at least one link partner 118, each configured to communicate with one another via communications link 126. The network node element 102 and the link partner 118 may communicate with each other, via link 126, using an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. The link partner 118 and/or node element 102 may represent a computer node element (e.g., host server system), switch, router, hub, network storage device, network attached device, non-volatile memory (NVM) storage device, etc. The link partner 118 may be configured and operate in a similar manner as the node 102, as described in greater detail below.

Node 102 generally includes a network controller 104 configured to communicate with the link partner 118 using the aforementioned Ethernet communications protocol. Network controller 104 is also generally configured to perform various operations in a defined order when a link is first established with the link partner 118 (e.g., upon system initialization, establishing a new link with the link partner, etc.). Such operations may include, for example, an auto-negotiation period during which various capabilities of the node 102 and the link partner 118 are exchanged, followed by a link training period during which the quality of the communications link 126 may be determined, followed by a link up state, or data mode, when data frames/packets are exchanged between the node 102 and link partner 118. The auto-negotiation period, link training period and data mode period may be defined under the aforementioned IEEE 802.3 communications protocol.

The network controller 104 includes PHY circuitry 106 generally configured to interface the node 102 with the link partner 118, via communications link 126. PHY circuitry 106 may comply or be compatible with, the aforementioned IEEE 802.3 Ethernet communications protocol, which may include, for example, 10 GBASE-KR, 40 GBASE-KR4, 40 GBASE-CR4, 100 GBASE-CR10, 100 GBASE-CR4, 100 GBASE-KR4, and/or 100 GBASE-KP4 and/or other PHY circuitry that is compliant with the aforementioned IEEE 802.3 Ethernet communications protocol and/or compliant with an after-developed communications protocol. PHY circuitry 106 includes transmit circuitry (Tx) 108 configured to transmit data packets and/or frames to the link partner 118, via link 126, and receive circuitry (Rx) 110 configured to receive data packets and/or frames from the link partner 118, via link 126. Of course, PHY circuitry 106 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 110 may include phase lock loop circuitry (PLL, not shown) configured to coordinate timing of data reception from the link partner 118. The communications link 126 may comprise, for example, a media dependent interface that may include, for example, copper twin-axial cable, backplane traces on a printed circuit board, etc. In some embodiments, the communications link 126 may include a plurality of logical and/or physical channels (e.g., differential pair channels) that provide separate connections between, for example, the Tx and Rx 108/110 of the node 102 and an Rx and Tx, respectively, of the link partner 118.

Network controller 104 also includes a forward error correction (FEC) module 112 configured to perform forward error correction operations on packets sent and/or received by the network controller 104. In general, according to the aforementioned IEEE 802.3 Ethernet communications protocol (such as Clause 74 or Clause 91), FEC operations include encoding of transmit data stream into an FEC frame (e.g. computation and inclusion of parity check symbols in the FEC encoded frame), and performing a data integrity check (e.g., recomputation of parity on received FEC frame and comparing against received parity symbols) and error correction, and decoding of received data stream. FEC is generally employed when the quality of the communications link 126 is below a threshold (e.g., a bit error bit error ratio (BER) threshold, etc.), and may be utilized in addition to other integrity checks that may be performed on a packet-by-packet basis (e.g., CRC, hash, etc.). The FEC module 112 may be configured to perform a plurality of FEC operations that may include a plurality of FEC protocols or modes, as may be defined by the aforementioned IEEE 802.3 Ethernet communications protocol. For example, the FEC module 112 may be configured to perform operations of a "light" FEC mode in which the error correction (coding gain) and latency are set to a minimal or low threshold. As another example, the FEC module 112 may be configured to operate a "heavy" FEC mode in which the coding gain is set to a maximal or high threshold. The "light" FEC mode may generally offer reduced processing burden and less error correction and detection (hence lower latency and power) over the "heavy" FEC mode, at the possible expense of increased packet errors. As another example, the FEC module 112 may contain multiple FEC modes and may be configured to operate with appropriate FEC mode that is optimized for a given medium (e.g. backplane copper traces or copper twin-axial cables) used for the communication link 126. FEC uses the coding gain to increase the link budget and BER performance on a given channel. The link budget consists of the electrical parameters which define the link 126, such as insertion loss, return loss, pulse response, etc. In general, there are tradeoffs for selecting an FEC scheme such as latency, power, error correction and detection capability, ease of implementation, etc. A "heavy" FEC code is generally capable of more error correction and detection than a "light" code at the expense of power, latency and ease of implementation. The amount of coding gain of the FEC could be selected to meet the minimum link budget and BER performance for a given medium.

Network controller 104 also includes an auto-negotiation module 114 configured to perform auto-negotiation operations between the node 102 and link partner 118. The auto-negotiation operations may be defined by the aforementioned IEEE 802.3 Ethernet communications protocol. In general, module 114 is configured to communicate to the link partner 118 a defined set of capabilities of the node 102. The defined set of capabilities may include, for example, PHY technology abilities, maximum link speed, next page, remote fault, Acknowledge, FEC and/or FEC mode capabilities, Pause ability, etc., as may be defined by the aforementioned IEEE 802.3 Ethernet communications protocol. Likewise, the link partner 118 is configured to communicate to the node 102 the defined set capabilities of the link partner 118. The exchange of capabilities between the node 102 and link partner 118 occurs within a defined auto-negotiation time period. The module 114 may be configured to format a link codeword base page (base page) 120 to define the capabilities of the node 102. The base page 120, defined by the aforementioned IEEE 802.3 Ethernet communications protocol, is a data structure (e.g., 48-bit frame) having certain bits that are utilized to convey defined capabilities of the node 102. According to the teachings of the present disclosure, the bit that is conventionally used for defining an FEC capability (e.g., bit 46) and the bit that is conventionally used to request enabling the FEC mode during the auto-negotiation period (e.g., bit 47) may be reassigned. In contrast to the conventional Ethernet communications protocol, the module 114 may be configured to modify the base page 120 to specify support for a plurality of FEC modes. For example, regarding FEC protocols and/or FEC modes, the base page 120 may be modified to include two bits (e.g., bits 46 and 47) that may be used to identify FEC capabilities and/or FEC modes that are supported by the network controller 104. For example, if bits 46 and 47 are set to 0, this indicates that the node 102 is not configured for FEC operations. If bit 46 is set to a 0 and bit 47 is set to a 1, this indicates that node 102 is configured to operate in a first FEC mode (e.g., "light" FEC mode); if bit 46 is set to 1 and bit 47 is set to 0, this indicates that node 102 is configured to operate in a second FEC mode (e.g., "heavy" FEC mode); and if bits 46 and 47 are both set to 1, this indicates that node 102 is configured to operate in the first and/or second FEC mode (e.g., "light" and "heavy" FEC modes). Of course, module 114 may be configured to modify additional bits of the base page 120 to support other/additional FEC modes.

Figure 1A:
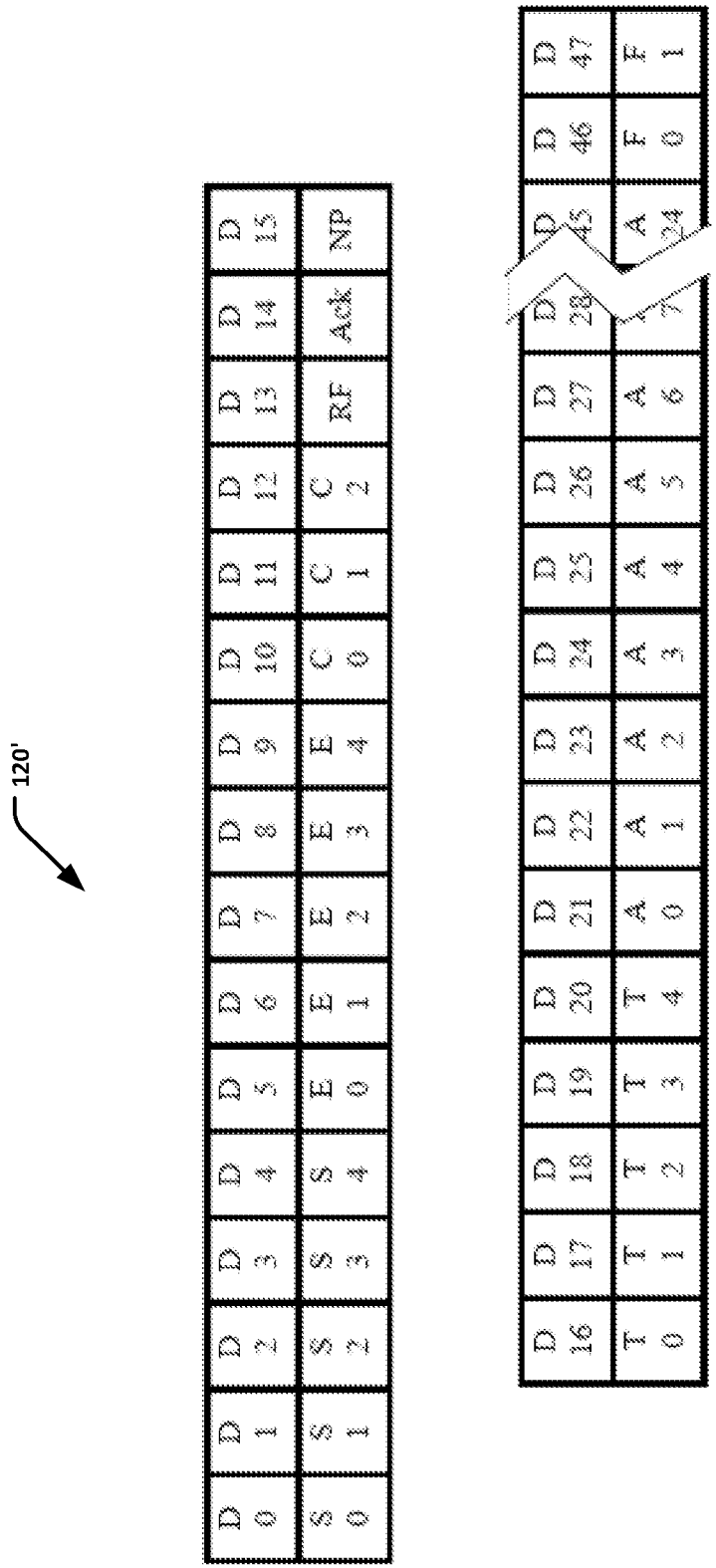
FIG. 1A is an example base page 120' according to one embodiment of the present disclosure.

FIG. 1A is an example base page 120' according to one embodiment of the present disclosure. The base page 120' of this embodiment may be used for PHY circuitry defined by the aforementioned Ethernet communications protocol, which may include, for example, 10BASE-KR, 40BASE-KR4, 40BASE-CR4, and/or 100 GBASE-CR10, etc. The example base page 120' depicts bits 0-47, and in particular, depicts bit 46 set to 0 and bit 47 set to 1, indicating that node 102 is configured to operate in a "light" FEC mode. Of course, the base page 120' is only a specific example, and the base page 120' may be modified according to the teachings set forth herein.

In the conventional Ethernet communications protocol, the quality of the communications link 126 is not determined during the defined auto-negotiation period, but the FEC capabilities and/or modes are enabled during the defined auto-negotiation period, if such enablement is specified by the base page 120. In contrast to the conventional Ethernet communications protocol, according to the teachings presented herein, the module 114 is further configured to format the base page 120 to indicate a request to resolve the enablement of a specified FEC capability and/or FEC mode during a data mode (link up state) period, instead of during the auto-negotiation period. Thus, according to the teachings presented herein, an FEC state may be dynamically resolved during the data mode period of operation. "Resolve" or "resolution", as used herein in this context, means a determination of whether to enable or disable FEC operations and/or whether to enable or disable an FEC mode, and such determination may be based on a channel quality parameter. The base page 120 may include a "reserved" data field (e.g., one or more bits that are specified but unused in the Ethernet communications protocol) defined by the aforementioned IEEE 802.3 Ethernet communications protocol.

In an embodiment, the module 114 is configured to format the base page 120 with a request flag, for example, by setting one or more bits of the reserved data field of the base page 120. In one example, the base page 120 may include a 16-bit reserved portion (e.g., bits 30-45). To support at least two different FEC modes, module 114 may be configured to use bits 44 and 45 as the FEC request flag. Thus, for example, if bits 44 and 45 are both set to 0, this may indicate that node 102 is incapable or otherwise unable to resolve FEC during the data mode period. If bits 44 bits 45 are set to 0 1, this may indicate a request by node 102 to dynamically resolve FEC during the data mode period, and that only a first FEC mode is supported. If bits 44 bits 45 are set to 1 0, this may indicate a request by node 102 to dynamically resolve FEC during the data mode period, and that a first and second FEC mode is supported. Of course, these are only examples of the types of flags that may be set in the base page 120, and in other embodiments, other predefined bit orders may be used to define an FEC mode request. In still other embodiments, the number of bits utilized in the reserved portion of the base page 120 may be dependent upon the number of defined FEC modes (as may be defined by the Ethernet communication protocol), and thus, additional FEC mode support may be established by setting additional bits in the reserved portion of the base page 120. In still other embodiments, in addition to dynamic resolution of FEC during a data mode, FEC protocols may be resolved during the auto-negotiation period (as may be defined in by the Ethernet communication protocol). The formatted base page 120 is transmitted to the link partner 118, and a similar base page (not shown) is transmitted from the link partner 118 to the node 102.

The node 102 and link partner 118 may be configured to concur to delay resolving FEC modes until the data mode period, for example, by exchanging acknowledgements, the expiration of timers, training protocols reaching a failure state, etc. In some embodiments, the FEC mode requested by the node 102 may be different than an FEC mode requested by the link partner 118. In such embodiments, the node 102 and link partner 118 may acknowledge such a state, and each may enable different FEC operation modes (e.g., asymmetric FEC mode enablement, described in greater detail below). Of course, during the auto-negotiation period, other parameters may be established such as PHY type including maximal link speed, Pause ability, next page, remote fault, Acknowledge, etc. Assuming that the link partner 118 is configured in a similar manner as the node 102, similar operations as described above may be performed by the link partner 118.

Network controller 104 also includes a link training module 116 configured to perform link training operations between the node 102 and link partner 118. In general, link training operations may be used to determine at least one channel quality parameter of at least one channel of the communications link 126. Examples of channel quality parameters include: bit error ratio (BER), signal-to-noise ratio (SNR), cross talk, environmental noise, linearity, impulse response, etc. The link training module 116 is configured to perform link training operations during a link training period, as defined by the aforementioned IEEE 802.3 Ethernet communications protocol. The link training period occurs after the auto-negotiation period. In operation, during the link training period, the node 102 and link partner 118 are each configured to exchange selected signals and/or packets and/or frames to determine, at least in part, at least one channel quality parameter. The link training operations may be defined by the aforementioned IEEE 802.3 Ethernet communications protocol, and may include, for example, obtaining a frame lock between the node 102 and link partner 118, Tx feed-forward equalization (FFE) handshake operations to provide adaptation of transmission coefficients to channel characteristics, digital signal processing convergence to "train" the respective Rx circuitry of the node 102 and link partner 118 to the respective Tx circuitry, which provides coefficient update information to the transmitter so that the transmitter can adjust its transmit equalizer coefficients to optimum values suitable for the particular channel. In addition, the module 116 is configured to analyze the quality of a received signal on a given channel using various techniques to generate one or more channel quality parameters (described below).

Custom and/or predefined techniques may be used to provide an analysis of the quality of a received signal on a given channel. For example, the link training module 116 may be configured to control various circuitry of the node 102 to perform a link side loopback procedure to determine at least one channel quality parameter. As another example, the system 100 may be configured to designate, during the auto-negotiation period, a master/slave relationship between the node 102 and link partner 118, and then during the link training period the master may be configured to instruct the slave to loopback after a predefined test timeout period (or generate a designated character), indicate the transition using the designated channel, and initiate loopback operations on the master side. As another example, the link training module 116 may be configured to generate an "eye test" template to determine if test signals received the Rx circuitry are of sufficient quality. As another example, the link training module 116 may be configured to generate on/off sequences of the Tx circuitry and determine channel crosstalk parameters. In yet another example, the link training module 116 may be configured to obtain information from attached medium, such as non-volatile storage media or mass storage media. In still another example, the link training module 116 may be configured to perform a time domain reflectrometry (TDR) test to determine signal reflectivity on a given channel between the node 102 and link partner 118. Of course, these are only examples of the techniques that may be used to provide an analysis of the link quality, and these techniques and/or other defined and/or custom/proprietary techniques may be used by the link training module 116. Selection of one or more such techniques may be based on, for example, the network system environment, the specified PHY circuitry, known channel quality limitations, etc.

Network controller 104 also includes a physical coding sublayer (PCS) module 128 configured to perform data mode operations between the node 102 and link partner 118. Data mode operations, as may be defined under the aforementioned Ethernet communications protocol, may include, for example, exchanging of data packets/data frames during a link up state (data mode period) between the node 102 and link partner 118. The PCS module 128, as may be defined under the aforementioned Ethernet communications protocol, is generally operable to shield other layers or modules (e.g., a reconciliation sublayer, MAC module, etc., described below) from the specific nature of the underlying communications link 126 and/or PHY specification. The PCS module 128 may include a transmit channel and a receive channel, and each channel can each operate in normal mode or, test-pattern mode. The interface between the PCS and the RS may comply with the aforementioned Ethernet Standard and may include, for example, CGMII (100 Gb), XGMII (10 Gb) and/or the XLGMII (40 Gb) interface communication protocols. When communicating with the RS, the PCS module 128 may utilize a synchronous data path, with packet delimiting being provided by transmit control signals (e.g., TXCn=1) and receive control signals (e.g., RXCn=1) The PCS module 128 may provide the functions necessary to map packets between an XGMII, CGMII, and/or XLGMII format and a PMA service interface format. When the transmit channel is in normal mode, the PCS module 128 transmit process may continuously generate blocks based upon the TXD <31:0> and TXC <3:0> signals on the XGMII, CGMII, and/or XLG-MII interface. The PCS module 128 may then pack the resulting bits into an appropriate format for the medium. When the receive channel is in normal mode, the PCS module 126 may attain block synchronization based on, for example, 2-bit synchronization headers. The PCS Module 126 may also configure a sync_status flag to indicate whether the PCS module 126 has obtained synchronization. Of course, other operations and features of the PCS module 128 may be defined by the aforementioned Ethernet communications protocol.

Network controller 104 also includes a media access control (MAC) module 136 configured to provide addressing and channel access control protocols for communication with the link partner 118, as may be defined by the aforementioned Ethernet communications protocol (e.g., MAC module 136 may be a Layer 2 device). The MAC module 136 defines a medium independent method of transmitting and receiving data. While the PHY circuitry 106 is generally unique to the medium (i.e. the copper cable or the backplane), the MAC module 136 may operate independent of the type of medium that is connected. The MAC module 136 may be configured for data encapsulation (transmit and receive), framing (frame boundary delimitation, frame synchronization), addressing (handling of source and destination addresses), and error detection (detection of physical medium transmission errors). The CSMA/CD MAC sublayer makes a best effort to acquire the medium and transfer a serial stream of bits to the Physical Layer. Of course, other operations and features of the MAC module 136 may be defined by the aforementioned Ethernet communications protocol.

Network controller 104 also includes a reconciliation sublayer (RS) module 134 configured to adapt the bit serial protocols of the MAC module 136 to the parallel format of the PCS module 128, as may be defined by the aforementioned Ethernet communications protocol. The MAC module 136 may provide data to the RS module 134 as a serial stream, one bit at a time. The RS module 134, in turn, may assimilate the appropriate number of bits specified by the PHY Circuitry 106, such that the information can be transmitted and received per the IEEE specification for the PHY circuitry 106. The interface between the MAC module 136 and the RS module 134 may include a physical layer signaling (PLS) interface as defined by the aforementioned Ethernet communications protocol. Of course, other operations and features of the RS module 134 may be defined by the aforementioned Ethernet communications protocol.

To enable dynamic resolution of FEC states and/or FEC modes during a data mode period, the network controller 104 also includes a channel quality monitoring module 122 configured to monitor at least one channel of the link 126 during a data mode period and generate at least one channel quality parameter. In some embodiments, the module 122 is configured to analyze the quality of signals received, during data mode, from the link partner 118, to determine at least one channel quality parameter of at least one channel of the link between node 102 and link partner 118. For example, to analyze the quality of a given channel, the module 122 may be configured to perform one or more of the custom/predefined techniques described above with reference to the link training module 116 (e.g., the "eye test"). In other embodiments, to analyze the quality of a given channel, the module 122 may be configured to perform operations to compute a channel pulse response using recovered signal techniques, obtaining information from a given medium (e.g., non-volatile or storage medium), and/or monitoring of physical coding sublayer bad synch header error counter, etc. Of course, these are only examples of the techniques that may be used to provide an analysis of the link quality, and these techniques and/or other defined and/or custom/proprietary techniques may be used by the link training module 116. Selection of one or more such techniques may be based on, for example, the network system environment, the specified PHY circuitry, known channel quality limitations, etc. The module 122 may be configured to analyze the quality of received signals, during the data mode, on a continuous or discrete (e.g., predetermined time interval) basis, based on, for example, processing overhead, bandwidth considerations, etc. The module 122 may also be configured to track channel quality parameters over time, to enable monitoring of changing channel quality conditions of a given channel/link.

During the data mode period, the module 122 may determine at least one channel quality parameter for at least one channel of the link 126 that indicates a change in FEC state may improve either packet flow speed or data integrity. For example, if an FEC mode was enabled during the auto-negotiation period (as defined under the conventional Ethernet communications protocols) and/or previously enabled during the data mode period, the module 122 may generate a channel quality parameter during the data mode period that indicates that the channel quality has improved such that a change in the current FEC mode state (e.g., "heavy" FEC to "light" FEC) would improve bandwidth, while keeping packet integrity within tolerable limits. As another example, the module 122 may generate a channel quality parameter during the data mode period that indicates that the channel quality has improved such that disabling the current FEC mode state (e.g., "light" FEC to FEC OFF) would improve bandwidth, while keeping packet integrity within tolerable limits. In another example, the module 122 may generate a channel quality parameter during the data mode period that indicates that the channel quality has degraded such that enabling FEC (if not previously enabled during the auto-negotiations period) and/or increasing the coding gain of the current FEC mode state (e.g., "light" FEC to "heavy" FEC) would improve packet integrity. The at least one channel quality parameter (e.g., bit error ratio (BER), signal-to-noise ratio (SNR), cross talk, environmental noise, linearity, impulse response, etc.), determined by module 122 may be used to resolve an FEC state during a data mode period, as described in greater detail below.

The channel quality monitoring module 122 may be configured to determine channel quality parameters on a channel-by-channel basis, or the channel quality parameters may be determined over the communications link as a whole. For example, a given PHY specification may specify a certain number of channels between the node 102 and the link partner 118. Determining channel quality parameters on a channel-by-channel basis may reveal that certain channels have better quality than others. To that end, the module 122 may also be configured to enable different FEC modes for different channels, based on, at least in part, the channel quality parameters of the respective channels. Determining channel quality parameters on a channel-by-channel basis may also permit asynchronous FEC modes to operate between the node 102 and link partner 118. For example, assume that there are two channels between the node 102 and link partner 118, and that the Rx circuitry of both the node 102 and link partner 118 each supports two FEC modes (e.g., "light" and "heavy" FEC modes). After channel quality determination for each of these two channels, it may be revealed that the Rx channel of the node 102 has better quality than the Rx channel of the link partner. As will be described in greater detail below, the PCS module 128 may enable a first FEC mode for the Rx channel (and the link partner 118 may enable the first FEC mode for the corresponding Tx channel), and similarly, the link partner 118 may enable a second FEC mode for the Rx channel associated with the link partner 118 (and the node 102 may enable the second FEC mode for the corresponding Tx channel). Thus, for a given link 126 with multiple channels, multiple FEC modes may be employed on a channel-by-channel basis, based on a channel quality parameter. Of course, this is only one example of asynchronous enablement of FEC modes that may be realized by the teachings of the present disclosure.

As noted above, the channel quality monitoring module 122 may be configured to determine channel quality parameters on a channel-by-channel basis, or the channel quality parameters may be determined over the communications link as a whole. For example, a given PHY specification may specify a certain number of channels between the node 102 and the link partner 118. Determining channel quality parameters on a channel-by-channel basis may reveal that certain channels have better quality than others. To that end, the channel quality monitoring module 122 may also be configured to enable different FEC modes for different channels, based on, at least in part, the channel quality parameters of the respective channels. Determining channel quality parameters on a channel-by-channel basis may also permit asynchronous FEC modes to operate between the node 102 and link partner 118. For example, assume that there are two channels between the node 102 and link partner 118, and that the Rx circuitry of both the node 102 and link partner 118 each supports two FEC modes (e.g., "light" and "heavy" FEC modes). After channel quality determination for each of these two channels, it may be revealed that the Rx channel of the node 102 has better quality than the Rx channel of the link partner. The channel quality monitoring module 122 may enable a first FEC mode for the Rx channel (and the link partner 118 may enable the first FEC mode for the corresponding Tx channel), and similarly, the link partner 118 may enable a second FEC mode for the Rx channel associated with the link partner 118 (and the node 102 may enable the second FEC mode for the corresponding Tx channel). Thus, for a given link 126 with multiple channels, multiple FEC modes may be employed on a channel-by-channel basis, based on a channel quality parameter. Of course, this is only one example of asynchronous enablement of FEC modes that may be realized by the teachings of the present disclosure.

Resolving FEC State During Data Mode Using Ordered Sets and PCS Control Codes

In one embodiment of the present disclosure, an FEC state may be changed (resolved) during a data mode period using ordered sets and PCS control codes. The PCS module 128 may be configured to determine, during the data mode period, whether to enable or disable at least one FEC mode based on, at least in part, the at least one channel quality parameter. The PCS module may be configured to exchange, during the data mode period, in-band control codes 132 with the link partner 118. The PCS module 114 may be configured to generate the transmission code to improve the transmission characteristics of the information to be transferred across the link 126 and to support control and data characters. The control codes 132, defined by the aforementioned IEEE 802.3 Ethernet communications protocol, are generally well-defined data structures having certain bits that include control and data characters. The control and data characters are encoded to create the in band control codes to delimit Ethernet packets on the interface from the MAC or to indicate "idle" or "error".

According to the teachings of the present disclosure, the PCS module 128 is configured to generate control codes, in addition to those defined by the aforementioned IEEE 802.3 Ethernet communications protocol, to indicate a request to change an FEC state (e.g., enable or disable FEC and/or and FEC mode). Based on a channel quality parameter of at least one channel, the PCS module 128 may generate and send an FEC enable/disable request signal to the link partner 118. The FEC enable/disable request signal may specify a request to utilize a specified FEC mode (as may be specified in the base page 120) and/or a request to disable a current FEC mode. The link partner 18, similarly configured, may acknowledge the request to change FEC states (via, for example, an acknowledge signal).

To prevent data disruption between the node 102 and the link partner 118 when an FEC mode is enabled or disabled during the data mode period, and to keep the link in an active state, the PCS module 128 may be further configured to signal the RS module 136 to pause data packet transfers while a new FEC mode is enabled or disabled, and to signal the RS module to resume data packet transfers once the new FEC mode is active or disabled. The PCS module 128 is configured to signal the RS module 134 using sequence ordered sets 130. The PCS module 128 is configured to format the sequence ordered sets 130 to instruct the RS module to initiate a pause or resume data flow operation. The sequence ordered sets 130 are generally defined by the IEEE 802.3 Ethernet communication protocol, which provides a fixed data structure (e.g., 4 byte sequence), however the conventional IEEE 802.3 Ethernet communication protocol (Clause 81) only provides link interruption and resume instructions for 10 Gigabit PHY protocols. In contrast to the conventional Ethernet communications protocol, the module 128 may be configured to modify the sequence ordered sets 130 to specify support for link interruption and resume for other PHY types, including, for example, 40 Gigabit and 100 Gigabit PHY protocols. In one example, the 8 byte sequence which constitutes the sequence ordered sets 130 may be modified to include addition data structures (e.g., setting lane 0 to a sequence value, setting all lanes 1-7 to a value of 0x0, except lane 3 which would be a value of 0x03) to enable link interruption by the MAC module 136 for a plurality of PHY protocols, including, for example, 40 Gigabit and 100 Gigabit protocols. In other embodiments, other sequence ordered sets, as may be defined by the IEEE 802.3 Ethernet communications protocol, may be used by the PCS module 128 to signal the RS module 134 for link pause and resume operations.

Figures 1B, 1C:
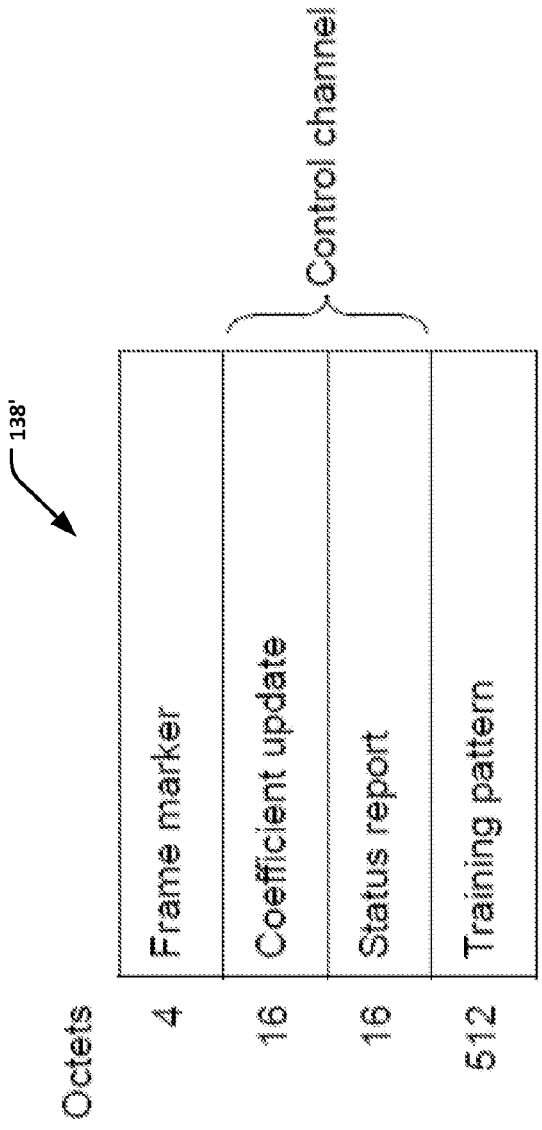
FIG. 1B illustrates an example sequence ordered set 130' according to one embodiment of the present disclosure.
FIG. 1C depicts an example of a training frame 138' according to one embodiment of the present disclosure.

FIG. 1B depicts an example sequence ordered set 130' according to one embodiment of the present disclosure. The sequence ordered set 130' of this embodiment may be used for link interruption signaling which may be used for 40 GbE and 100 GbE (IEEE 802.3, clause 81) link interruption.

When the PCS module 128 signals the RS module 134 for link pause or resume, the RS module may communicate with MAC module 136 to enable these operations. The PLS interface between the RS module 134 and the MAC module 136 may utilize primitive signaling protocols generally defined by the aforementioned IEEE 802.3 Ethernet communications protocol. For example, 10 Gigabit PHYs under Clause 46 of the IEEE 802.3 Ethernet communications protocol can utilize a primitive signal called PLS_carrier.indication to enable the MAC module 136 to pause and resume data transmission and reception (e.g., for use with energy efficient Ethernet (EEE) protocols). According to the teachings of the present disclosure, the RS module 134 is configured to modify the PLS_carrier.indication primitive to enable the MAC module 136 to pause data transmission for other PHY types, including, for example, 40 Gigabit and 100 Gigabit protocols. To that end, the RS module 134 may modify signaling protocols defined under Clause 81 of the IEEE 802.3 Ethernet communications protocol to enable the RS module 134 to instruct the MAC module 136 to pause and resume data transmissions. In other embodiments, other PLS primitives, as may be defined by the IEEE 802.3 Ethernet communications protocol, may be used by the RS module 134 and the MAC module 136 to enable link interruption and resume operations.

In operation, when the channel quality monitoring module 122 determines at least one channel quality parameter for at least one channel, and the at least one channel quality parameter indicates that changing FEC states (e.g., enabling or disabling FEC and/or changing FEC modes), the module 122 may signal module 128 to initiate a change in FEC states. In turn, module 128 may format the sequence ordered sets 130, as described above, to instruct the MAC module 136 to interrupt the link 126 to enable a pause of data transmission and/or reception. In addition, the module 128 may format the in-band control codes 132, as described above, and exchange these control codes 132 with the link partner 118 to resolve a new FEC state. Once the node 102 and link partner 118 have established a new FEC state, the PCS module 128 may format the sequence ordered sets 130, as described above, to instruct the MAC module 136 to resume data transmission and/or reception. Using the in-band control codes 132 and sequenced ordered sets 130, as described above, provides the ability for the node 102 to dynamically enable and/or disable FEC states during the data mode period while the link with the link partner 118 remains active and without causing a link failure between the node 102 and the link partner 118. These operations may offer significant advantages over conventional approaches for processing overhead, throughput speed and/or packet integrity. Of course, the link partner 118 may be configured to operate in a similar manner.

Resolving FEC State During Data Mode Using "Fast" Link Re-Training

In another embodiment of the present disclosure, an FEC state may be changed (resolved) during a data mode period using "fast" link re-training protocols. Instead of using additional control codes that specify an FEC state to resolve an FEC state between the node 102 and link partner 118 during the data mode period, as described in the previous embodiment, the present embodiment utilizes "fast" link re-training operations during the data mode to resolve an FEC state. This embodiment may be utilized, for example, if the signal quality of a given channel/link has degraded to such an extent that in-band control codes (e.g., control codes 132, described above) are not detected by the link partner during the data mode, for example if the link quality has degraded due to environmental conditions such as temperature, voltage, cross talk, etc. Accordingly, in this embodiment, the network controller 104 may also include a "fast" link re-training module 124 configured to initiate "fast" link re-training operations, during the data mode period, between the node 102 and link partner 118 to resolve an FEC state based on, at least in part, a determination of at the least one channel quality parameter of at the least one channel (via module 122). The term "fast", as used in this context, is generally defined as a link training process that takes less time than the link training performed by the link training module 116 described above, and such "fast" operations can occur while the link is in a link up state (data mode). "Fast" link re-training protocols are generally defined by the IEEE 802.3 Ethernet communication protocol.

To enable communications between the node element 102 and the link partner 118 under noisy or degraded link conditions, the fast link re-training module 124 is configured to format link interruption codes 140 to notify the link partner 118 to momentarily pause data. In one example, the link interruption codes may include repetitions of a signal type known to have high transmissibility in noisy or degraded conditions. For example, such a signal may include repetitions of a PAM2 sequence, followed by repetitions of zero symbols, etc.

In addition, the module 124 may be configured to format training frames 138 to enable the training operations and to resolve a defined FEC protocol and/or FEC mode during the data mode period. The training frames 138, defined by the aforementioned IEEE 802.3 Ethernet communications protocol, are defined data structures that include, for example, a delimited, fixed 4 octet frame marker. The training frames 138 typically include the following fields: a frame marker field, a coefficient update field, status report field and a training pattern field. FIG. 1C depicts an example of a training frame 138' according to one embodiment of the present disclosure. The training frame includes a plurality of octets representing the frame marker field 160, coefficient update field 162, status report field 164 and the training pattern field 166. In contrast to training frames defined by the aforementioned IEEE 802.3 Ethernet communications protocol, according to the teachings of this embodiment, a reserved data field in the coefficient update field and/or status report field may be formatted with an FEC mode enablement flag to indicate at least one FEC mode for at least one communication channel. For example, the coefficient update field of the training frames 138 includes a plurality of reserved bits, and one or more of these reserved bits may be formatted by module 124 to set a flag to indicate an FEC mode for at least one channel. FIG. 1D depicts an example of a coefficient update field 162' according to one embodiment of the present disclosure. In another example, the status report field of the training frames 138 includes a plurality of reserved bits, and one or more of these reserved bits may be formatted by module 124 to set a flag to indicate an FEC mode for at least one channel. FIG. 1E depicts an example of a status report field 164' according to one embodiment of the present disclosure. Of course, in some other embodiments, other portions of the training frames 138 may be formatted with an FEC enablement flag. The training frames 138 may be exchanged between the node 102 and link partner 118 (e.g., using in-band communication techniques) during the data mode period.

In operation, when the channel quality monitoring module 122 determines at least one channel quality parameter for at least one channel, and the at least one channel quality parameter indicates that changing FEC states (e.g., enabling or disabling FEC and/or changing FEC modes) may improve packet integrity and/or data throughput, the module 122 may signal module 124 to format the sequence ordered sets 130, as described above, to instruct the MAC module 136 to interrupt the link 126 to enable a pause of data transmission and/or reception. In addition, the module 128 may format the link interruption codes 140 to notify the link partner 118 to momentarily pause data flow, and to begin "fast" link re-training on the link partner side. The PCS module 128 may signal the module 124 to initiate "fast" link re-training operations on at least one channel of the link between the node 102 and the link partner 118. The module 124 may format the training frames 138, as described above, and exchange the formatted training frames 138 with the link partner 118 to begin "fast" link re-training operations. Once the node 102 and link partner 118 have established a new FEC state, the module 124 may format the link interruption codes 140 to notify the link partner 118 to resume data flow using the "fast" link re-training operations and the link interruption codes, as described above, provides the ability for the node 102 to dynamically enable and/or disable FEC states during the data mode period while the link with the link partner 118 remains active and without causing a link failure between the node 102 and the link partner 118. These operations may offer significant advantages over conventional approaches for processing overhead, throughput speed and/or packet integrity. Of course, the link partner 118 may be configured to operate in a similar manner.

The foregoing example embodiments provide various techniques for in-band signaling between the node 102 and the link partner 118 to change an FEC mode/state during the data mode period. Other in-band signaling techniques may be used in other embodiments. For example, the node 102 may be configured to generate CGMII TXT and TXD lane encoding signals that are encoded with modified word sets. Alternatively or additionally, the node 102 may be configured to generate modified command sets during a low power idle wake event, as may be specified under an Energy Efficient Ethernet communications protocol. Of course, these are only examples of in-band signaling techniques that may be utilized by the present invention to change an FEC mode/state during the data mode period, and other techniques may be recognized by one skilled in the art, and all such techniques are deemed within the scope of the present disclosure in this context.

Figure 2:
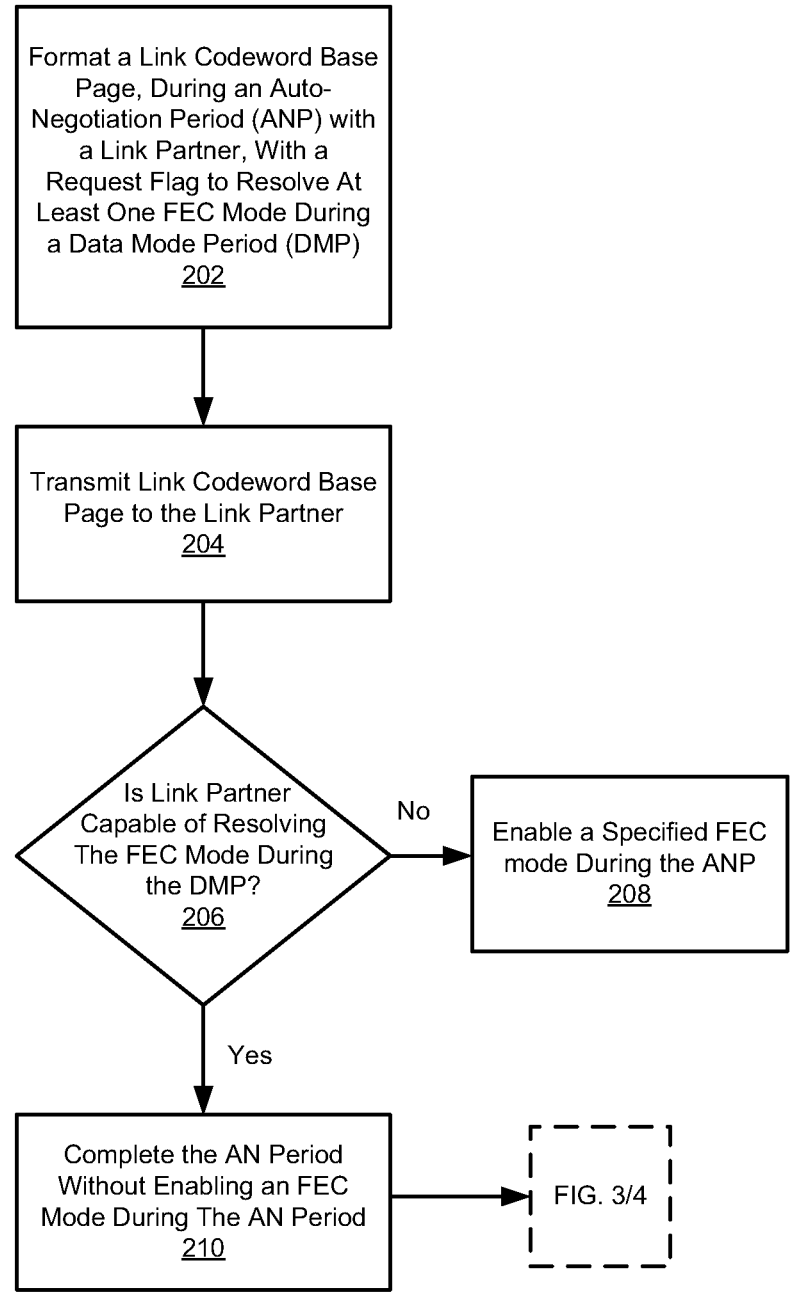
FIG. 2 is a flowchart of operations according to one embodiment of the present disclosure.

FIG. 2 is a flowchart of operations 200 according to one embodiment of the present disclosure. In particular, the flowchart 200 illustrates operations of a node element during an auto-negotiation period. Operations of this embodiment include formatting a link codeword base page, during an auto-negotiation period with a link partner, with a request to resolve at least one forward error correction (FEC) mode during a data mode period 202. The data mode period occurs after the auto-negotiation period, and the data mode period generally defines a link-up state when the node and link partner are exchanging data packets. Operations also include transmitting the link codeword base page to the link partner 204. Operations further include determining if the link partner is capable of resolving the FEC mode during the data mode period 206. If the link partner is incapable of resolving the FEC mode during the data mode period, operations may also include enabling a specified FEC mode during the auto-negotiation period 208 (and/or a link training period). If the link partner is so capable, the auto-negotiation period may be completed without enabling an FEC mode during the auto-negotiation period 210, or, alternatively, the auto-negotiation period may be completed by enabling a specified FEC mode during the auto-negotiation period and/or a link training period.

Figure 3:
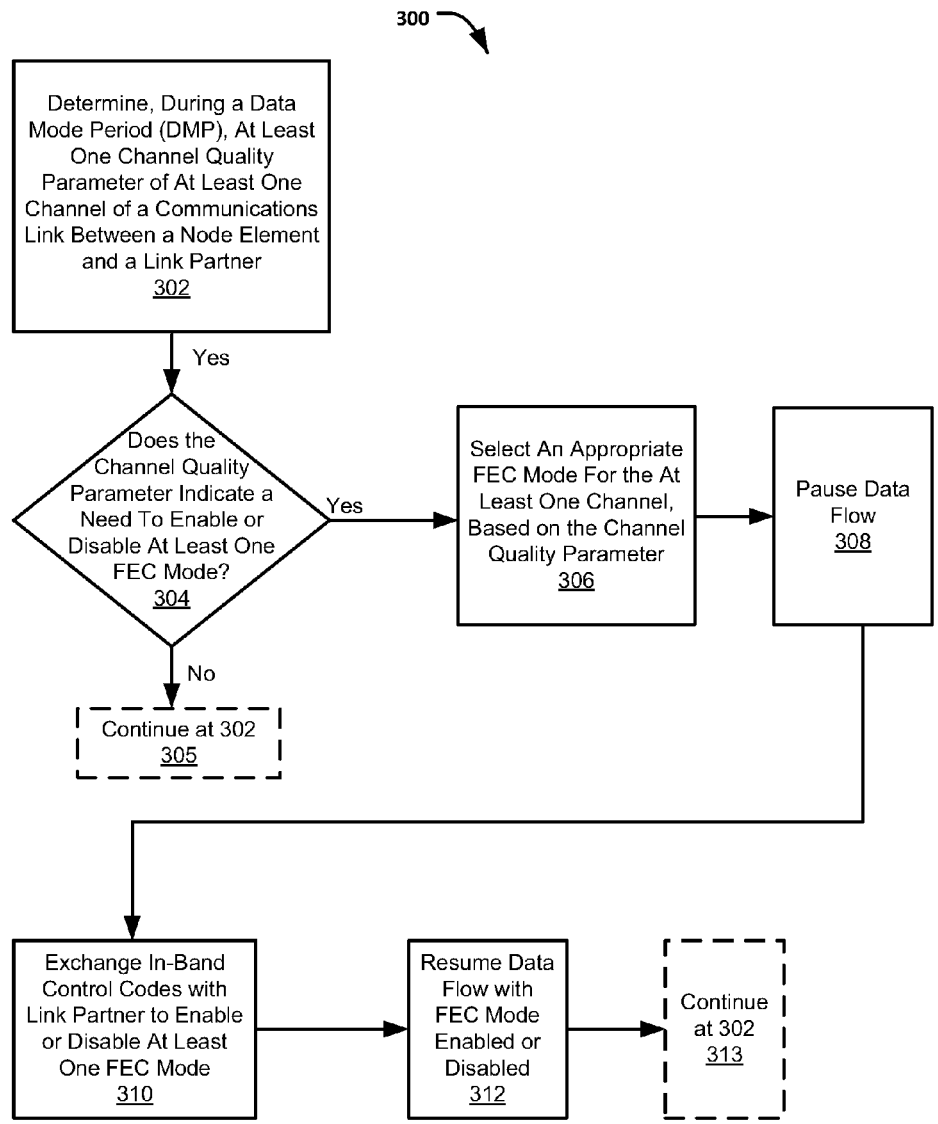
FIG. 3 is a flowchart of operations according to another embodiment of the present disclosure.

FIG. 3 is a flowchart of operations 300 according to another embodiment of the present disclosure. In particular, the flowchart 300 illustrates one example embodiment of operations of a node element during a data mode period. Operations of this embodiment include determining, during a data mode period, at least one channel quality parameter of at least one channel of a communications link between a network node element and a link partner 302. Operations may also include determining if the at least one channel quality parameter is indicative of a need to enable or disable at least one supported FEC mode 304. For example, if an FEC mode was previously enabled (for example, during an auto-negotiation period, link training period and/or during the data mode period), the channel quality parameter may indicate that the channel would have acceptable packet integrity if the current FEC mode is disabled and/or if a different FEC mode is enabled. Alternatively, if an FEC mode is not currently enabled, the channel quality parameter may indicate that the channel has degraded such that enabling at least one FEC mode would improve packet integrity. If the at least one channel quality parameter is indicative of a need to enable or disable at least one FEC mode (304), operations may also include selecting an appropriate mode for the at least one channel 306. Operation 306 may assume that the channel quality parameter indicates a need to enable at least one FEC mode, and this operation may be omitted if the channel quality parameter indicates that all FEC modes may be disabled. Operations may further include pausing data flow in the node element 308. Operations may also include exchanging in-band control codes with the link partner to enable or disable at least one FEC mode 310. Operations also include resuming data flow, by the node element with the link partner, with an FEC mode enabled or disabled 312. Operations may continue at 302 (as noted by 313). If the at least one channel quality parameter does not indicate a need to enable or disable at least one FEC mode (304), operations may continue at 302 (as noted by 305).

Figure 4:
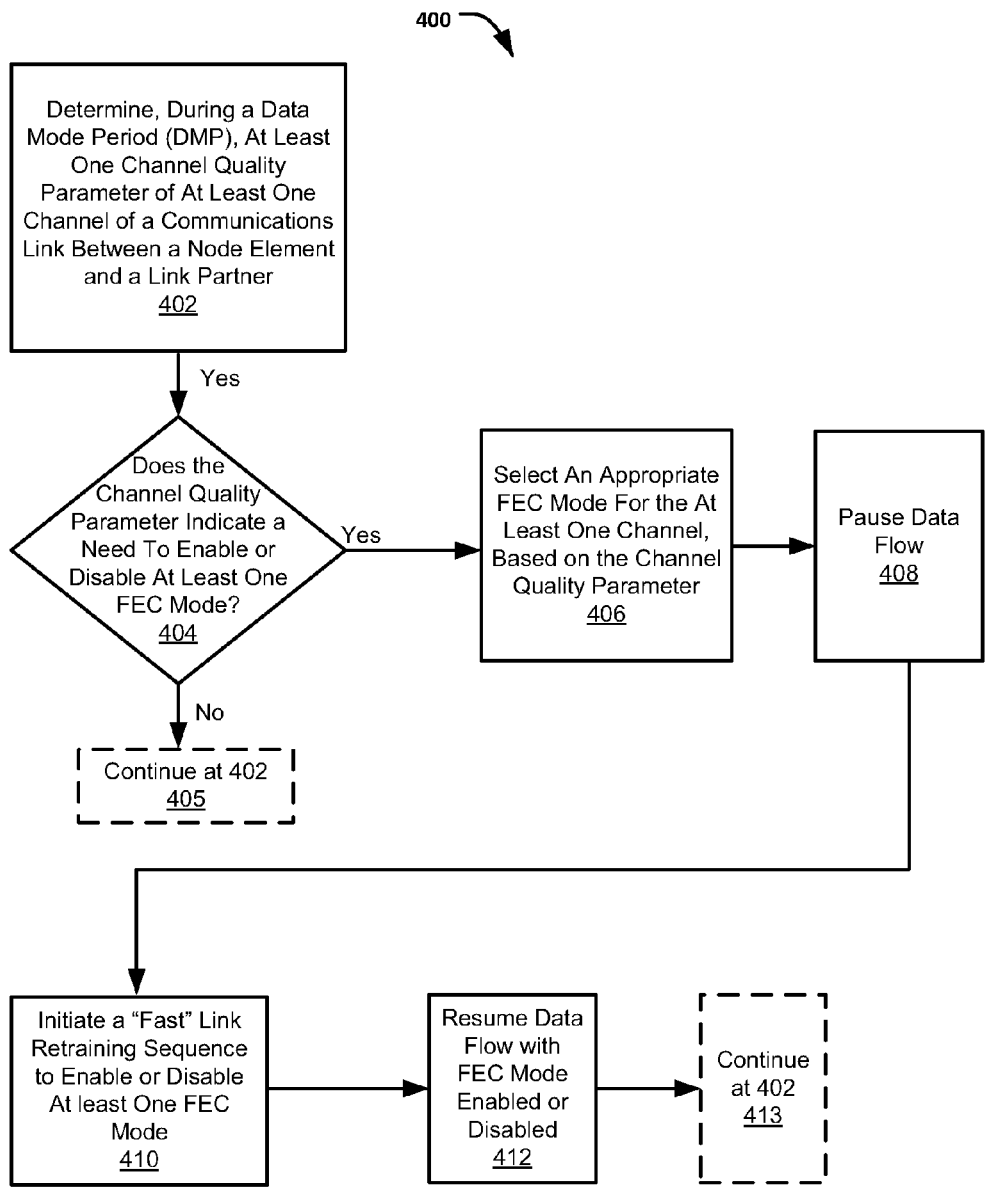
FIG. 4 is a flowchart of operations according to another embodiment of the present disclosure.

FIG. 4 is a flowchart of operations 400 according to another embodiment of the present disclosure. In particular, the flowchart 400 illustrates another example embodiment of operations of a node element during a data mode period. Operations of this embodiment include determining, during a data mode period, at least one channel quality parameter of at least one channel of a communications link between a network node element and a link partner 402. Operations may also include determining if the at least one channel quality parameter is indicative of a need to enable or disable at least one supported FEC mode 404. For example, if an FEC mode was previously enable (for example, during an auto-negotiation period, link training period and/or during the data mode period), the channel quality parameter may indicate that the channel would have acceptable packet integrity if the current FEC mode is disabled and/or if a different FEC mode is enabled. Alternatively, if an FEC mode is not currently enabled, the channel quality parameter may indicate that the channel has degraded such that enabling at least one FEC mode would improve packet integrity. If the at least one channel quality parameter is indicative of a need to enable or disable at least one FEC mode (404), operations may also include selecting an appropriate mode for the at least one channel 406. Operation 406 may assume that the channel quality parameter indicates a need to enable at least one FEC mode, and this operation may be omitted if the channel quality parameter indicates that all FEC modes may be disabled. Operations may further include pausing data flow in the node element 408. Operations may also include initiating a "fast" link retraining sequence between the node element and the link partner to enable or disable at least one FEC mode 410. Operations also include resuming data flow, by the node element with the link partner, with an FEC mode enabled or disabled 412. Operations may continue at 402 (as noted by 413). If the at least one channel quality parameter does not indicate a need to enable or disable at least one FEC mode (404), operations may continue at 402 (as noted by 405).

Figure 5:
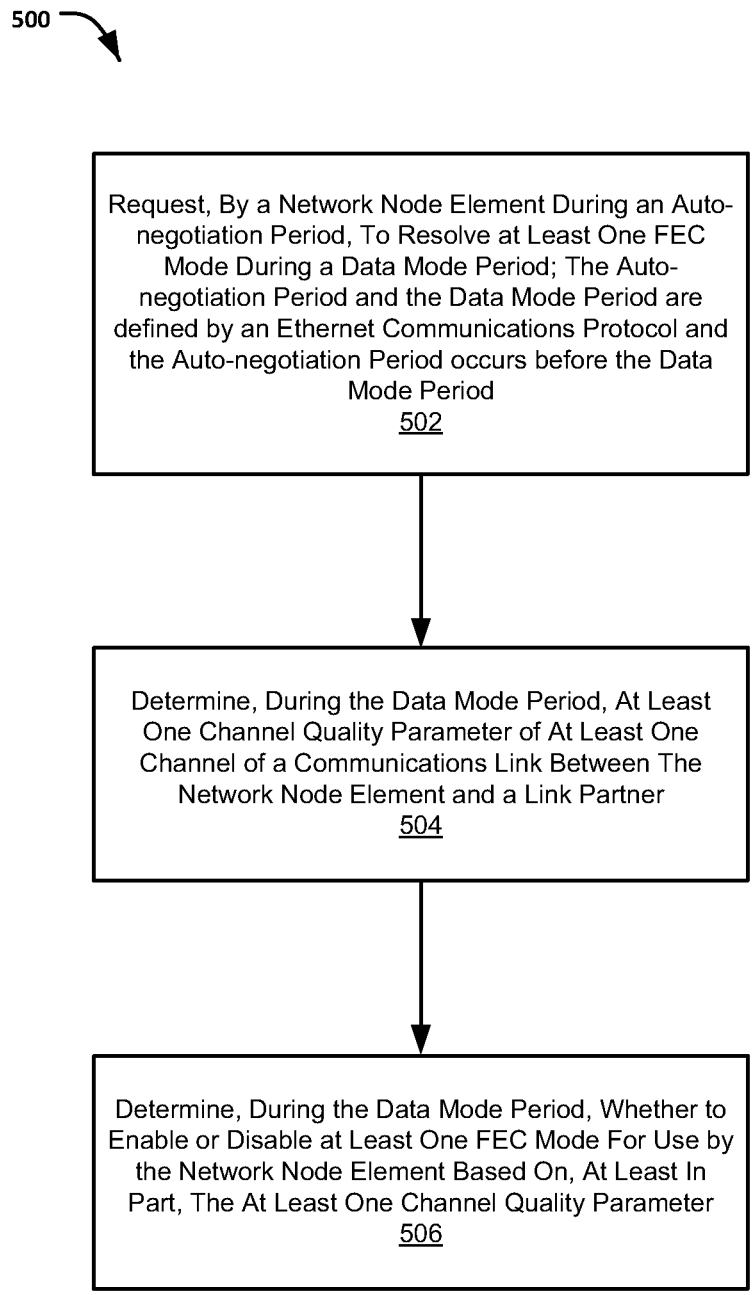
FIG. 5 is a flowchart of operations according to another embodiment of the present disclosure.

FIG. 5 is a flowchart of operations 500 according to another embodiment of the present disclosure. In particular, the flowchart 500 illustrates operations of a node element during an auto-negotiation period and a data mode period. Operations of this embodiment include requesting, by the network node element during an auto-negotiation period, to resolve at least one FEC mode during a subsequent data mode period 502. The auto-negotiation period and data mode period are defined by an Ethernet communications protocol, and the auto-negotiation period occurs before data mode period. Operations may also include determining, during the data mode period, at least one channel quality parameter of at least one channel of a communications link between a network node element and a link partner 504. Operations may also include determining, during the data mode period, whether to enable or disable at least one FEC mode for used by the network node element based on, at least in part, the at least one channel quality parameter 506.

While the flowcharts of FIGS. 2, 3, 4 and 5 illustrate operations according various embodiments, it is to be understood that not all of the operations depicted in FIGS. 2, 3, 4 and/or 5 are necessary for other embodiments. In addition, it is fully contemplated herein that in other embodiments of the present disclosure, the operations depicted in FIGS. 2, 3, 4 and/or 5, and/or other operations described herein may be combined in a manner not specifically shown in any of the drawings, and such embodiments may include less or more operations than are illustrated in FIGS. 2, 3, 4 and/or 5. Thus, claims directed to features and/or operations that are not exactly shown in one drawing are deemed within the scope and content of the present disclosure.

The foregoing is prided as exemplary system architectures and methodologies, modifications to the present disclosure are possible. For example, node 102 and/or link partner 118 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network controller 104. System memory may include I/O memory buffers configured to store one or more data packets that are to be transmitted by, or received by, network controller 104. Chipset circuitry may generally include "North Bridge" circuitry (not shown) to control communication between the processor, network controller 104 and system memory.

Node 102 and/or link partner 118 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage mediums having stored thereon, individually or in combination, instructions that when executed by one or more processors perform the methods. The processor may include, for example, a processing unit and/or programmable circuitry in the network controller 104 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Accordingly, the present disclosure provides an example network node element that includes a network controller configured to communicate with a link partner using an Ethernet communications protocol. The network controller is further configured to request, during an auto-negotiation period, to resolve at least one forward error correction (FEC) mode during a data mode period; wherein the auto-negotiation period and the data mode period are defined by an Ethernet communications protocol and the auto-negotiation period occurs before the data mode period. The network node element is further configured to determine, during the data mode period, at least one channel quality parameter of at least one channel of a communication link between the network controller and the link partner; and determine, during the data mode period, whether to enable or disable at least one FEC mode for use by the network node element based on, at least in part, the at least one channel quality parameter.

The present disclosure also provides a system that includes one or more storage mediums having stored thereon, individually or in combination, instructions that when executed by one or more processors result in the following operations including: requesting, during an auto-negotiation period between a node element and a link partner, to resolve at least one FEC mode during a data mode period; wherein the auto-negotiation period and the data mode period are defined by an Ethernet communications protocol and the auto-negotiation period occurs before the data mode period; determining, during the data mode period, at least one channel quality parameter of at least one channel of a communication link between the network node element and the link partner; and determining, during the data mode period, whether to enable or disable at least one FEC mode based on, at least in part, the at least one channel quality parameter.

The present disclosure also provides a method for resolving a forward error correction (FEC) protocol that includes requesting, by a network node element during an auto-negotiation period between the node element and a link partner, to resolve at least one FEC mode during a data mode period. The auto-negotiation period and the data mode period are defined by an Ethernet communications protocol and the auto-negotiation period occurs before the data mode period. The method also includes determining, by the network node element during the data mode period, at least one channel quality parameter of at least one channel of a communication link between the network node element and the link partner; and determining, by the network node element during the data mode period, whether to enable or disable at least one FEC mode for use by the network node element based on, at least in part, the at least one channel quality parameter.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network node, comprising:
a network controller configured to communicate with a link partner; the network controller further configured to:
request, from the link partner during an auto-negotiation period, to resolve at least one forward error correction (FEC) mode during a data mode period wherein the auto-negotiation period starts before the data mode period;
determine, during the data mode period, at least one channel quality parameter of at least one channel of a communication link between the network controller and the link partner;
determine, during the data mode period, whether to enable or disable the at least one FEC mode for use by the network node based on, at least in part, the at least one channel quality parameter; and
enabling or disabling the at least one FEC mode during the data mode period in response to the enable or disable determination, wherein the communication link remains active throughout the data mode period.

2. The network node of claim 1, wherein the channel quality parameter is selected from the group of a bit error rate (BER), signal-to-noise ratio (SNR), cross talk, environmental noise, linearity or impulse response.

3. The network node of claim 1, wherein the network controller is further configured to format a link codeword base page with a flag indicating the request to resolve the at least one FEC mode during the data mode period.

4. The network node of claim 1, wherein the network controller is further configured to pause a data flow between the node element and the link partner while the at least one FEC mode is enabled or disabled.

5. The network node of claim 4, wherein the network controller is further configured to resume the data flow between the node element and the link partner after the at least one FEC mode is enabled or disabled.

6. The network node of claim 1, wherein the network controller is further configured to perform fast link re-training operations to determine, during the data mode period, whether to enable or disable the at least one FEC mode for use by the network node based on, at least in part, the at least one channel quality parameter; wherein the fast link re-training operations are less processor intensive than link training operations performed during a link training period.

7. The network node of claim 6, wherein the network controller is further configured to format a coefficient update field with at least one flag indicating a plurality of FEC mode capabilities of the network controller.

8. The network node of claim 6, wherein the network controller is further configured to format a status report field with at least one flag indicating a plurality of FEC mode capabilities of the network controller.

9. The network node of claim 1, wherein the at least one of FEC mode includes a first FEC mode and a second FEC mode and wherein the first FEC mode has less coding gain than the second FEC mode.

10. The network node of claim 1, wherein the auto-negotiation period and the data mode period comply with an Institute of Electrical and Electronics Engineers 802.3 Ethernet communications protocol.

11. The network node of claim 1, wherein the network controller is further configured to format in-band control code signals with a plurality of FEC mode capabilities of the network controller and exchange with the link partner, during the data mode, the in-band control signals to select the at least one FEC mode to enable or disable.

12. A method for resolving a forward error correction (FEC) protocol, comprising:
requesting, by a network node element during an auto-negotiation period between the node element and a link partner, to resolve at least one FEC mode during a data mode period; wherein the auto-negotiation period starts before the data mode period;

determining, by the network node element during the data mode period, at least one channel quality parameter of at least one channel of a communication link between the network node element and the link partner;

determining, by the network node element during the data mode period, whether to enable or disable the at least one FEC mode for use by the network node element based on, at least in part, the at least one channel quality parameter; and enabling or disabling the at least one FEC mode during the data mode period in response to the enable or disable determination, wherein the communication link remains active throughout the data mode period.

13. The method of claim 12, wherein the channel quality parameter is selected from the group of a bit error rate (BER), signal-to-noise ratio (SNR), cross talk, environmental noise, linearity or impulse response.

14. The method of claim 12, further comprising formatting, by the network node element, a link codeword base page with a flag indicating the request to resolve the at least one FEC mode during the data mode period.

15. The method of claim 12, further comprising pausing, by the network node element, a data flow between the network node element and the link partner while the at least one FEC mode is enabled or disabled.

16. The method of claim 15, further comprising resuming, by the network node element, the data flow between the node element and the link partner after the at least one FEC mode is enabled or disabled.

17. The method of claim 12, further comprising performing, by the network node element, fast link re-training operations to determine, during the data mode period, whether to enable or disable the at least one FEC mode for use by the network node element based on, at least in part, the at least one channel quality parameter; wherein the fast link re-training operations are less processor intensive than link training operations performed during a link training period.

18. The method of claim 17, further comprising formatting, by the network node element, a coefficient update field with at least one flag indicating a plurality of FEC mode capabilities of the network controller.

19. The method of claim 17, further comprising formatting, by the network node element, a status report field with at least one flag indicating a plurality of FEC mode capabilities of the network controller.

20. The method of claim 12, wherein the at least one of FEC mode includes a first FEC mode and a second FEC mode and wherein the first FEC mode has less coding gain than the second FEC mode.

21. The method of claim 12, wherein the auto-negotiation period and the data mode period comply with an Institute of Electrical and Electronics Engineers 802.3 Ethernet communications protocol.

22. The method of claim 12, further comprising formatting, by the network node element, in-band control code signals with a plurality of FEC mode capabilities of the network controller and exchanging with the link partner, during the data mode, the in-band control signals to select the at least one FEC mode to enable or disable.

23. A system comprising, one or more non-transitory storage mediums having stored thereon, individually or in combination, instructions that when executed by one or more processors result in the following operations comprising:

requesting, during an auto-negotiation period between a node element and a link partner, to resolve at least one FEC mode during a data mode period; wherein the auto-negotiation period starts before the data mode period;

determining, during the data mode period, at least one channel quality parameter of at least one channel of a communication link between the network node element and the link partner;

determining, during the data mode period, whether to enable or disable the at least one FEC mode based on, at least in part, the at least one channel quality parameter; and enabling or disabling the at least one FEC mode during the data mode period in response to the enable or disable determination, wherein the communication link remains active throughout the data mode period.

24. The system of claim 23, wherein the channel quality parameter is selected from the group of a bit error rate (BER), signal-to-noise ratio (SNR), cross talk, environmental noise, linearity or impulse response.

25. The system of claim 23, wherein the instructions that when executed by one or more processors results in the following additional operations comprising formatting a link codeword base page with a flag indicating the request to resolve the at least one FEC mode during the data mode period.

26. The system of claim 23, wherein the instructions that when executed by one or more processors results in the following additional operations comprising pausing a data flow between the network node element and the link partner while the at least one FEC mode is enabled or disabled.

27. The system of claim 26, wherein the instructions that when executed by one or more processors results in the following additional operations comprising resuming the data flow between the node element and the link partner after the at least one FEC mode is enabled or disabled.

28. The system of claim 23, wherein the instructions that when executed by one or more processors results in the following additional operations comprising performing fast link re-training operations to determine, during the data mode period, whether to enable or disable the at least one FEC mode for use by the network node element based on, at least in part, the at least one channel quality parameter; wherein the fast link re-training operations are less processor intensive than link training operations performed during a link training period.

29. The system of claim 28, wherein the instructions that when executed by one or more processors results in the following additional operations comprising formatting a coefficient update field with at least one flag indicating a plurality of FEC mode capabilities of the network controller.

30. The system of claim 28, wherein the instructions that when executed by one or more processors results in the following additional operations comprising formatting a status report field with at least one flag indicating a plurality of FEC mode capabilities of the network controller.

31. The system of claim 23, wherein the at least one of FEC mode includes a first FEC mode and a second FEC mode and wherein the first FEC mode has less coding gain than the second FEC mode.

32. The system of claim 23, wherein the auto-negotiation period and the data mode period comply with an Institute of Electrical and Electronics Engineers 802.3 Ethernet communications protocol.

33. The system of claim 23, wherein the instructions that when executed by one or more processors results in the following additional operations comprising formatting in-band control code signals with a plurality of FEC mode capabilities of the network controller and exchanging with the link partner, during the data mode, the in-band control signals to select the at least one FEC mode to enable or disable.

* * * * *